United States Patent
Adams et al.

(10) Patent No.: US 12,500,928 B2
(45) Date of Patent: Dec. 16, 2025

(54) SIMULATED PHISHING LURE GENERATION USING ARTIFICIAL INTELLIGENCE FOR IMPROVED CYBERSECURITY

(71) Applicant: Proofpoint, Inc., Sunnyvale, CA (US)

(72) Inventors: Joseph Trent Adams, Highlands Ranch, CO (US); Kurt Wescoe, Pittsburgh, PA (US)

(73) Assignee: Proofpoint, Inc., Sunnyvale, CA (US)

( * ) Notice: Subject to any disclaimer, the term of this patent is extended or adjusted under 35 U.S.C. 154(b) by 288 days.

(21) Appl. No.: 18/133,657

(22) Filed: Apr. 12, 2023

(65) Prior Publication Data

US 2023/0336588 A1 Oct. 19, 2023

Related U.S. Application Data

(60) Provisional application No. 63/330,612, filed on Apr. 13, 2022.

(51) Int. Cl.
*H04L 9/40* (2022.01)
*G06F 40/20* (2020.01)

(52) U.S. Cl.
CPC .......... *H04L 63/1483* (2013.01); *G06F 40/20* (2020.01)

(58) Field of Classification Search
CPC ..... H04L 63/1483; G06F 40/30; G06F 40/20; G06N 3/08; G06N 20/00
See application file for complete search history.

(56) References Cited

U.S. PATENT DOCUMENTS

| | | | |
|---|---|---|---|
| 2017/0103674 A1* | 4/2017 | Sadeh-Koniecpol | ......................... G06F 21/566 |
| 2017/0244746 A1* | 8/2017 | Hawthorn | ................ G06F 21/55 |
| 2019/0215335 A1* | 7/2019 | Benishti | .............. H04L 63/1441 |
| 2021/0136110 A1* | 5/2021 | Sites | ...................... G06F 21/577 |
| 2021/0248229 A1* | 8/2021 | Kras | ........................ H04L 51/08 |
| 2021/0264430 A1* | 8/2021 | Searl | ....................... G06N 20/00 |

(Continued)

OTHER PUBLICATIONS

Amos, Zac, "Can AI Write a More Convinving Phishing Email Than Humans?" Unite.AI, Apr. 24, 2023, https://www.unite.ai/can-ai-write-a-more-convincing-phishing-email-than-humans/.

(Continued)

*Primary Examiner* — Lesa M Kennedy
(74) *Attorney, Agent, or Firm* — Banner & Witcoff, Ltd.

(57) ABSTRACT

Aspects of the disclosure relate to automated simulated phishing lure generation for cybersecurity training. The computing platform may receive personalization data. The computing platform may generate, using a phishing lure generation model, one or more simulated synthetic phishing lures based on the personalization data. The computing platform may send the one or more simulated synthetic phishing lures to one or more user devices and one or more commands directing the one or more user devices to display the one or more simulated synthetic phishing lures, which may cause the one or more user devices to display the one or more simulated synthetic phishing lures. The computing platform may receive, from the one or more user devices, feedback data corresponding to user interactions with the simulated one or more synthetic phishing lures. The computing platform may update, using the feedback data, the phishing lure generation model.

19 Claims, 8 Drawing Sheets

(56) References Cited

U.S. PATENT DOCUMENTS

| | | | | |
|---|---|---|---|---|
| 2022/0038498 | A1* | 2/2022 | Kras | H04L 63/1483 |
| 2022/0070214 | A1* | 3/2022 | Kras | H04L 63/1483 |
| 2022/0210188 | A1* | 6/2022 | Grewal | H04L 63/1483 |
| 2023/0075964 | A1* | 3/2023 | Singh | G06N 3/045 |
| 2024/0372885 | A1* | 11/2024 | Moore | G06F 40/56 |

OTHER PUBLICATIONS

European Union Agency for Law, "The Criminal use of ChatGPT—a cautionary tale about large language models," Mar. 27, 2023, https://www.europol.europa.eu/media-press/newsroom/news/criminal-use-of-chatgpt-cautionary-tale-about-large-language-models.

Lemos, Robert, "Better Phishing, Easy Malicious Implants: How AI Could Change Cyberattacks," DarkReading, Jan. 11, 2023, https://www.darkreading.com/vulnerabilities-threats/phishing-malicious-implants-ai-cyberattacks.

Adams, J. Trent, "The Transformer Speaks," Medium.com, May 8, 2020, https://jtrentadams.medium.com/the-transformer-speaks-8481219dcbc.

Brian Kime's Twitter thread "AI-powered attacks," Sep. 22, 2021, https://twitter.com/BrianPKime/status/1440687658871648265 <https://protect-us.mimecast.com/s/O2nGC4xW82HYjjOQcOSOa9>.

Goodin, Dan, "Hackers are selling a service that bypasses ChatGPT restrictions on malware," ars Technica Feb. 8, 2023, https://arstechnica.com/information-technology/2023/02/now-open-fee-based-telegram-service-that-uses-chatgpt-to-generate-malware/.

GPTZero—The World's #1 AI Detector with over 1 Million Users, 2022-2023, https://gptzero.me/.

Hoang, Lê Nguyên, "The real danger with ChatGPT," GitHub, Jan. 22, 2023, https://github.com/lenhoanglnh/manuscripts/blob/main/ethics/22-chatgpt-fr.md.

Justin from Gold Penguin, "Is GPTZero a Game Changer for AI Recognition?" Jan. 27, 2023, https://goldpenguin.org/blog/gptzero-review/.

Kim, Sung, "How to Detect OpenAI's ChatGPT Output," Medium.com, Dec. 11, 2022, https://medium.com/geekculture/how-to-detect-if-an-essay-was-generated-by-openais-chatgpt-58bb8adc8461.

King, Adam D., Machine Learning Engineer, https://adamdking.com/.

Lakshmanan, Ravie, "Microsoft Warns of a Wide-Scale Phishing-as-a-Service Operation," The Hacker News, Sep. 22, 2021, https://thehackernews.com/2021/09/microsoft-warns-of-wide-scale-phishing.html.

Lim, Eugene, et al., "Hacking Humans with AI as a Service," Cyber Security Group, Def Con 29, Aug. 5, 2021-Aug. 8, 2021, https://media.defcon.org/DEF%20CON%2029/DEF%20CON%2029%20presentations/Eugene%20Lim%20Glenice%20Tan%20Tan%20Kee%20Hock%20-%20Hacking%20Humans%20with%20AI%20as%20a%20Service.pdf <https://protect-us.mimecast.com/s/F4mCC73D6MuEPPKxuN00gu>.

Newman, Lily Hay, "AI Wrote Better Phishing Emails Than Humans in a Recent Test," Wired.com, Aug. 7, 2021, https://www.wired.com/story/ai-phishing-emails/.

NIST Phishing Scale, National Institute of Standards and Technology, U.S. Department of Commerce, https://www.nist.gov/image/nist-phishing-scale.

Proofpoint, "What is Spear Phishing?" https://www.proofpoint.com/us/threat-reference/spear-phishing.

Radford, Alec, et al., "Language Models are Unsupervised Multitask Learners," https://cdn.openai.com/better-language-models/language_models_are_unsupervised_multitask_learners.pdf.

Wodecki, Brad, "Language Models like GPT-3 could be used to send more believable phishing emails," AI Business, Aug. 9, 2021, https://cdn.openai.com/better-language-models/language_models_are_unsupervised_multitask_learners.pdf.

* cited by examiner

SIMULATED PHISHING LURE GENERATION USING ARTIFICIAL INTELLIGENCE FOR IMPROVED CYBERSECURITY

CROSS-REFERENCE TO RELATED APPLICATIONS

This application claims the benefit of and priority to U.S. Provisional Patent Application Ser. No. 63/330,612, filed Apr. 13, 2022, and entitled "AI Phishing Lures," which is incorporated by reference herein in its entirety.

TECHNICAL FIELD

Aspects of the disclosure relate to computer software and hardware for using artificial intelligence for the generation of synthetic phishing lures. Additional aspects of the disclosure relate to using artificial intelligence to distinguish between synthetic and manually generated (and/or otherwise malicious) phishing lures.

BACKGROUND

Increasingly, individuals and/or organizations face various cybersecurity threats that often arise from malicious content included in phishing messages. Certain training tools (such as phishing messages used for training purposes) have been developed to assist individuals in identifying such phishing messages. In some instances, however, the manual development of effective phishing training messages may consume significant resources to deploy them at scale. Additionally, in many instances, effective phishing training messages benefit from being customized rather than being generic. Furthermore, it may be difficult for inbound messaging systems to distinguish between phishing messages configured for use in training and those that are otherwise live. As a result, such inbound messaging systems may fail to detect various live phishing messages and/or may deflect phishing messages configured for training.

SUMMARY OF THE INVENTION

Aspects of the disclosure provide effective, efficient, scalable, and convenient technical solutions that address and overcome the technical problems associated with the generation of simulated phishing messages, and detection of actual phishing messages. In accordance with one or more embodiments of the disclosure, a computing platform comprising at least one processor, a communication interface, and memory storing computer-readable instructions may receive personalization data. The computing platform may generate, using a phishing lure generation model, one or more simulated synthetic phishing lures based on the personalization data. The computing platform may send the one or more simulated synthetic phishing lures to one or more user devices and one or more commands directing the one or more user devices to display the one or more simulated synthetic phishing lures, which may cause the one or more user devices to display the one or more simulated synthetic phishing lures. The computing platform may receive, from the one or more user devices, feedback data corresponding to user interactions with the one or more simulated synthetic phishing lures. The computing platform may update, using the feedback data, the phishing lure generation model.

In one or more instances, the one or more synthetic phishing lures may be phishing messages created using one or more of artificial intelligence or machine learning for awareness training. In one or more instances, the personalization data may be one or more of: intelligence data, user-specific data, or regional data. In one or more instances, the intelligence data may be business intelligence data specific to a company or an industry associated with users of the one or more user devices.

In one or more examples, the user-specific data may indicate roles of users of the one or more user devices within a company or department. In one or more examples, the regional data may indicate information associated with current events happening in a region where users of the one or more user devices are located.

In one or more instances, the phishing lure generation model may be a natural language generation algorithm. In one or more instances, the natural language generation algorithm may be one or more of: generative pre-trained transformer 2 (GPT2) or generative pre-trained transformer 3 (GPT3).

In one or more examples, the computing platform may train, using historical phishing messages and legitimate messages, the phishing lure generation model. In one or more examples, sending the one or more simulated synthetic phishing lures to the one or more user devices may include sending the one or more simulated synthetic phishing lures as electronic messages to the one or more user devices, and sending the one or more commands directing the one or more user devices to display the one or more simulated synthetic phishing lures may cause the one or more user devices to display the one or more simulated synthetic phishing lures along with legitimate messages.

In one or more instances, sending the one or more commands directing the one or more user devices to display the one or more simulated synthetic phishing lures may cause the one or more user devices to display the one or more simulated synthetic phishing lures within a cybersecurity training application. In one or more instances, the cybersecurity training application may prompt users to identify problematic content within the one or more simulated synthetic phishing lures.

In one or more examples, the computing platform may send, to an inbound message filtering system, the one or more simulated synthetic phishing lures, where the inbound message filtering system may be configured to train, using the one or more simulated synthetic phishing lures, a synthetic lure detection model, configured to distinguish between synthetically generated phishing lures and manually generated phishing lures. In one or more examples, the inbound message filtering system may be configured to: 1) receive an inbound message; 2) input, into the synthetic lure detection model, the inbound message; and 3) output, using the synthetic lure detection model, a classification of the inbound message, indicating one of: synthetically generated phishing lure or manually generated phishing lure.

In one or more instances, the inbound message filtering system may be configured to execute one or more security actions. In one or more instances, executing the one or more security actions may include one or more of: quarantining the inbound message, routing the inbound message for further security review, or modifying one or more traffic routing rules corresponding to a sender of the inbound message.

In one or more examples, the computing platform may update, using the classification of the inbound message, the synthetic lure detection model. In one or more examples, the inbound message filtering system may be integrated into the computing platform.

BRIEF DESCRIPTION OF DRAWINGS

The present disclosure is illustrated by way of example and not limited in the accompanying figures in which like reference numerals indicate similar elements and in which.

DETAILED DESCRIPTION

Figure 1:
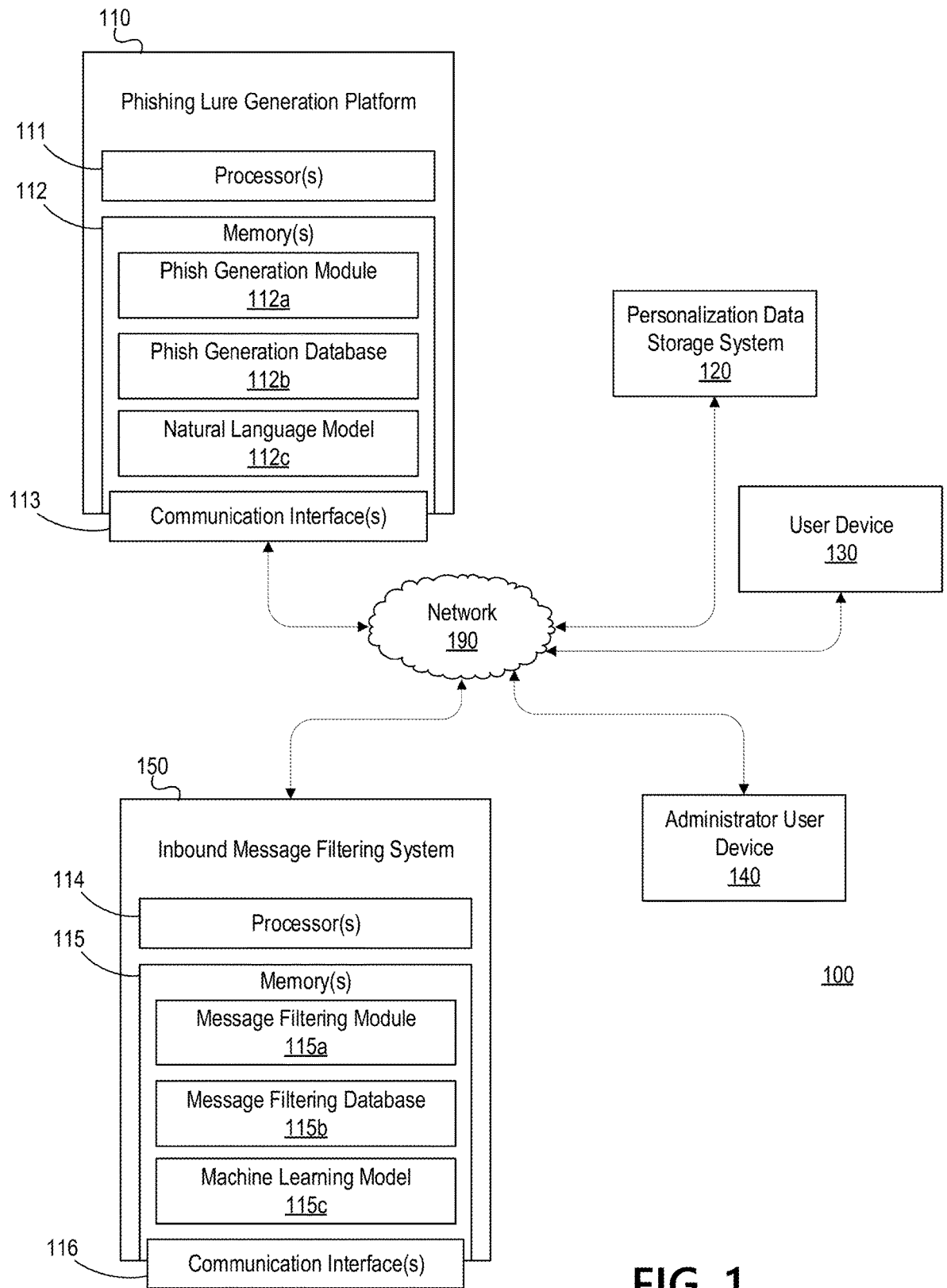
FIG. 1 depicts an illustrative operating environment for using artificial intelligence for phishing lure generation and detection in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction of the concepts described in further detail below, systems and methods for the generation of simulated phishing lures and detection of actual phishing lures are described herein. More specifically, described herein are systems and methods for automatically generating synthetic phishing lures for use in cybersecurity training that are contextually relevant and can be personalized to the end users, who may receive the lures for training purposes.

Focusing on the use of artificial intelligence (e.g., Generative Pre-trained Transformer (GPT) and/or other natural language simulation tools) for cybersecurity training applications, there is currently no efficient and effective way of automatically generating and delivering simulated attacks that can be created quickly, at scale, and especially when including personalized information that may be specific to the end user receiving the simulated attacks. The creation of topical simulated phishing lures may take weeks to design, and personalization at scale may add additional delay (e.g., based on the number of personalized targets). Personalization may be important because it may more effectively test specific users given the proven effectiveness of spear phishing targeting individuals. These techniques may also be used to provide insights that may help the test recipients, and enable them to learn to avoid the real attacks that they may be likely to encounter. Using conventional systems and approaches, a completely manual effort may be required to personalize a simulated attack—i.e., a test administrator may manually create a personalized lure to target a given user for training purposes.

One or more embodiments may include the creation of timely lures based upon current news about breaches and/or other topical issues typically abused by threat actors. In some instances, personal data may be used, in combination with natural language generation algorithms, to generate targeted synthetic phishing lures. In some instances, these lures may be provided to users as messages (e.g., artificial phishing messages). Additionally or alternatively, they may be provided to the users through a progressive learning tool. The system may also include functionality for sending and presenting the automatically generated lures, and receiving and processing feedback data to tune and/or adjust the generation algorithms.

These concepts further relate to systems and methods for distinguishing between manually and synthetically generated messages. Using current techniques, it may be difficult to distinguish between manually and synthetically generated messages. In some instances, the ability to make such distinctions may improve the speed at which synthetic phishing lures for adversarial testing may be generated and/or otherwise improve/facilitate the training of other models/systems. For example, synthetic messages may include signals indicative of their automated generation (e.g., uniformity, consistency, spelling, n-gram sequence patterns, spacing, paragraphs, line breaks, and/or other language and/or semantic based indicators), and models/algorithms may be trained on these signals to distinguish between messages accordingly. Once fully trained, the output of the systems and methods may be used to detect potentially malicious content (e.g., as part of an inbound message filtering system) and also may be used to train other detection systems (e.g., as part of an adversarial testing and training system).

FIG. 1 depicts an illustrative computing environment for using artificial intelligence for phishing lure detection and synthetic phishing lure generation in accordance with one or more example embodiments. Referring to FIG. 1, computing environment 100 may include one or more computer systems. For example, computing environment 100 may include phishing lure generation platform 110, personalization data storage system 120, user device 130, administrator user device 140, and inbound message filtering system 150.

Phishing lure generation platform 110 may include one or more processors 111, memory 112, and communication interface 113. A data bus may interconnect processor 111, memory 112, and communication interface 113. Communication interface 113 may be a network interface configured to support communication between phishing lure generation platform 110 and one or more networks (e.g., network 190, or the like). Memory 112 may include one or more program modules having instructions that when executed by processor 111 cause phishing lure generation platform 110 to perform one or more functions described herein and/or one or more databases that may store and/or otherwise maintain information which may be used by such program modules and/or processor 111. In some instances, the one or more program modules and/or databases may be stored by and/or maintained in different memory units of phishing lure generation platform 110 and/or by different computing devices that may form and/or otherwise make up phishing lure generation platform 110. For example, memory 112 may have, host, store, and/or include a phish generation module 112a, a phish generation database 112b, and a natural language model 112c. Phish generation module 112a may have instructions that direct and/or cause phishing lure generation platform 110 to execute advanced simulated phishing lure generation techniques, as discussed in greater detail below. Phish generation database 112b may store information used by phish generation module 112a and/or phishing lure generation platform 110 in executing enhanced simulated phishing lure generation techniques and/or in performing other functions. Natural language model 112c may be configured to dynamically train and/or otherwise refine one or more algorithms/models configured to produce simulated/personalized phishing lures and/or in performing other functions, as is discussed in greater detail below.

Personalized data storage system 120 may include one or more computing devices (e.g., servers, server blades, or the like) and/or other computing components (e.g., processors, memories, communication interfaces, and/or other components). Personalized data storage system 120 may be configured to store personalized data such as intelligence data (e.g., business intelligence data that may be specific to a company and/or industry associated with a specific user or set of users to be trained, and/or other data), user-specific data (e.g., data specific to a specific user or set of users to be trained, such as information identifying their role within a company or department, and/or other data), regional/news data (e.g., information associated with current events that may be happening in a region where a specific user or set of users to be trained are located, and/or other data), and/or other data that may be used to generate synthetic (e.g., automatically generated using artificial intelligence, machine learning, and/or otherwise for awareness training) phishing lures.

User device 130 may include one or more computing devices (e.g., laptop computers, desktop computers, mobile devices, smartphones, tablets, wearable devices, and/or other devices) and/or other computer components (e.g., processors, memories, communication interfaces). For example, user device 130 may be configured to access electronic messages, a phish training application, and/or perform other functions. In some instances, user device 130 may cause display of and/or otherwise present one or more graphical user interfaces (e.g., electronic messaging interfaces, phish training interfaces, and/or other interfaces).

Administrator user device 140 may include one or more computing devices (e.g., laptop computers, desktop computers, mobile devices, smartphones, tablets, and/or other devices) and/or other computer components (e.g., processors, memories, communication interfaces). For example, administrator user device 140 may be configured to receive security notifications, and/or perform other functions. In some instances, administrator user device 140 may cause display of and/or otherwise present one or more graphical user interfaces (e.g., security notifications, phish detection notifications, and/or other interfaces).

Inbound message filtering system 150 may include one or more processors 114, memory 115, and communication interface 116. A data bus may interconnect processor 114, memory 115, and communication interface 116. Communication interface 116 may be a network interface configured to support communication between inbound message filtering system 150 and one or more networks (e.g., network 190, or the like). Memory 115 may include one or more program modules having instructions that when executed by processor 114 cause inbound message filtering system 150 to perform one or more functions described herein and/or one or more databases that may store and/or otherwise maintain information which may be used by such program modules and/or processor 114. In some instances, the one or more program modules and/or databases may be stored by and/or maintained in different memory units of inbound message filtering system 150 and/or by different computing devices that may form and/or otherwise make up inbound message filtering system 150. For example, memory 115 may have, host, store, and/or include a message filtering module 115a, a message filtering database 115b, and a machine learning model 115c. Message filtering module 115a may have instructions that direct and/or cause inbound message filtering system 150 to execute advanced message classification and/or filtering techniques, as discussed in greater detail below. Message filtering database 115b may store information used by message filtering module 115a and/or inbound message filtering system 150 in executing enhanced message classification and/or filtering techniques and/or in performing other functions. Machine learning model 115c may be configured to dynamically train and/or otherwise refine one or more algorithms/models configured to distinguish between synthetic and manually generated messages and/or in performing other functions, as is discussed in greater detail below.

Although FIG. 1 illustrates the phishing lure generation platform 110 and the inbound message filtering system 150 as two separate devices, in some instances, the functions of these devices and/or the devices themselves may be included in a single device/platform without departing from the scope of the disclosure. Furthermore, although a single personalization data storage system 120, user device 130, and administrator user device 140 are described, any number of these devices may be included in the computing environment 100 without departing from the scope of the disclosure.

Computing environment 100 also may include one or more networks, which may interconnect phishing lure generation platform 110, personalization data storage system 120, user device 130, administrator user device 140, and inbound message filtering system 150. For example, computing environment 100 may include a network 190 (which may interconnect, e.g., phishing lure generation platform 110, personalization data storage system 120, user device 130, administrator user device 140, and inbound message filtering system 150).

In one or more arrangements, phishing lure generation platform 110, personalization data storage system 120, user device 130, administrator user device 140, and inbound message filtering system 150 may be any type of computing device capable of receiving a user interface, receiving input via the user interface, and communicating the received input to one or more other computing devices. For example, phishing lure generation platform 110, personalization data storage system 120, user device 130, administrator user device 140, inbound message filtering system 150, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of phishing lure generation platform 110, personalization data storage system 120, user device 130, administrator user device 140, and inbound message filtering system 150 may, in some instances, be special-purpose computing devices configured to perform specific functions.

Figure 2A:
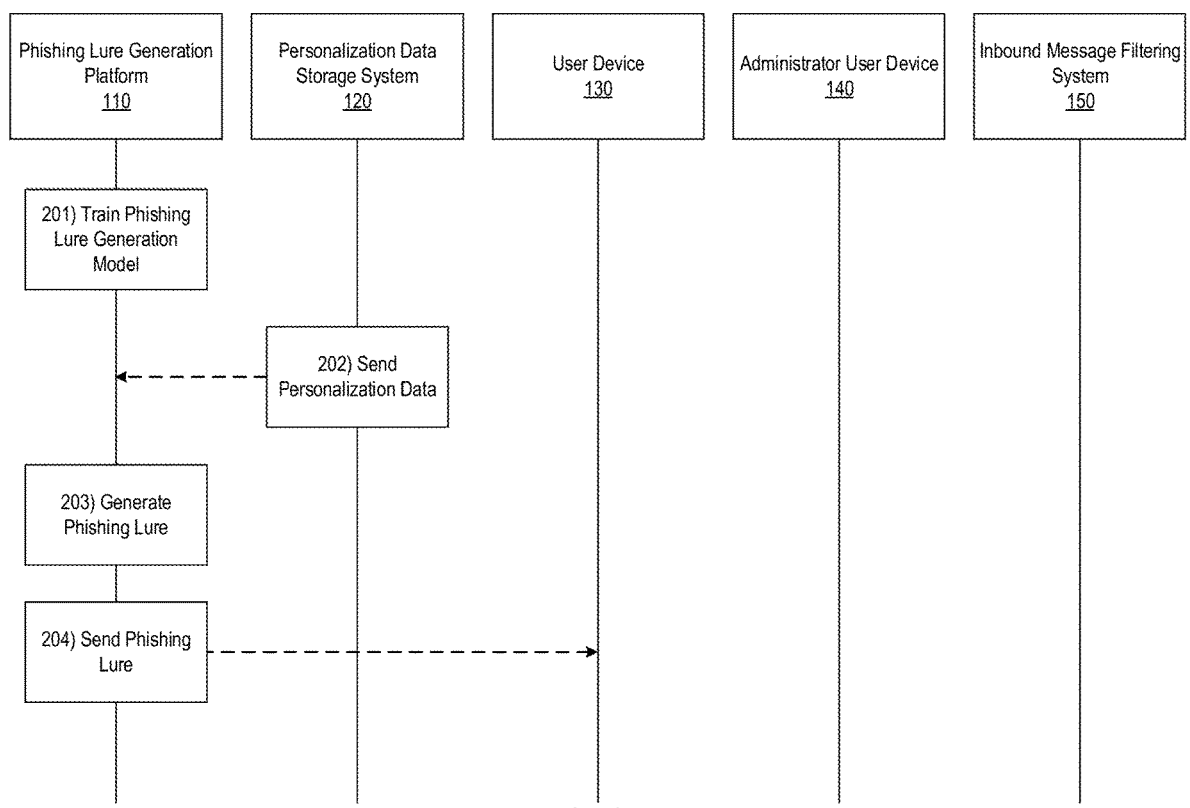
FIGS. 2A-2D depict an illustrative event sequence for using artificial intelligence for phishing lure generation and detection in accordance with one or more example embodiments.

FIGS. 2A-2D depict an illustrative event sequence for using artificial intelligence for phishing lure detection and synthetic phishing lure generation in accordance with one or more example embodiments. Referring to FIG. 2A, at step 201, phishing lure generation platform 110 may train a phishing lure generation model. For example, the phishing lure generation platform 110 may train a natural language model and/or algorithm (e.g., a natural language processing (NLP) model/algorithm, natural language understanding (NLU) model/algorithm, and/or other model/algorithm) to automatically produce synthetic phishing lures. In some instances, in training the phishing lure generation model, the phishing lure generation platform 110 may train a GPT2 and/or GPT3 model, and/or other artificial intelligence, machine learning, natural language, and/or other model/algorithm. For example, the phishing lure generation platform 110 may input a plurality of previously generated phishing messages, historical legitimate messages, and/or other messages which may, e.g., have been generated, detected, and/or otherwise obtained, which may train the phishing lure generation model to produce synthetic phishing messages. In some instances, the phishing lure generation platform 110 may further train the phishing lure generation model to identify formats of phishing lures that may be most effective for a particular recipient (e.g., using intelligence data corresponding to an effectiveness of the various phishing messages otherwise used to train the phishing lure generation model). In some instances, in training the phishing lure generation model, the phishing lure generation platform 110 may configure the phishing lure generation model to output a formatted synthetic phishing lure, which may then be populated (e.g., by the phishing lure generation model) using personalization data for a given user.

At step 202, the personalization data storage system 120 may send personalization data to the phishing lure generation platform 110. For example, the personalization data storage system 120 may send intelligence data, which may include business intelligence data specific to a company and/or industry associated with a specific user or set of users to be trained, and/or other data. Additionally or alternatively, the personalization data storage system 120 may send user-specific data, which may be additional data specific to a specific user or set of users to be trained, such as information identifying their role within a company, department, and/or otherwise (which may e.g., be received from a company personnel management system such as access protocol (LDAP) data store, identity provider (IDP) data store, or the like). Additionally or alternatively, the personalization data storage system 120 may send regional and/or other news data, such as information associated with current events happening in a region where a specific user or set of users to be trained are located, and/or other information. In some instances, the personalization data storage system 120 may send the personalization data while a wired and/or wireless data connection is established between the personalization data storage system 120 and the phishing lure generation platform 110.

At step 203, the phishing lure generation platform 110 may generate a simulated synthetic phishing lure (e.g., automatically generated phishing lure) using the phishing lure generation model and the personalization data for a target user (e.g., a user of the user device 130). For example, the phishing lure generation platform 110 may input the personalization data into the phishing lure generation model to identify a corresponding format for the phishing lure, and may then populate the format with the personalization data (or a portion thereof). For example, the phishing lure generation model may identify a format, previously used to produce simulated phishing lures for target users with corresponding personalization data to the personalization data received at step 202. In some instances, in generating the synthetic phishing lure, the phishing lure generation platform 110 may generate the lure in a number of different languages (e.g., for use in training users in their respective native language). In some instances, in generating the simulated synthetic phishing lure, the phishing lure generation platform 110 may automatically ingest headlines from news feeds that automatically generate a list of potential lures to be presented for consideration.

By generating the simulated synthetic phishing lure in this way, the phishing lure generation platform 110 may provide an efficient and effective way to automatically generate simulated personalized phishing messages at scale. Such personalization may be important because it may more effectively test specific users given the proven effectiveness of spear phishing targeting individuals. Furthermore, the generation of such simulated synthetic phishing lures may enable testing of recipients, which may enable them to learn to avoid real attacks that they may be likely to encounter. Using the systems and methods described herein, such benefits may be achieved without the delays that may result from the manual generation of such personalized messages, especially when considering scaling such generation (e.g., to an entire enterprise, or the like).

Furthermore, unlike conventional approaches to generating simulated phishing messages, this approach may vastly improve the speed with which believable (e.g., authentic seeming) synthetic phishing lures may be created, and may further allow for more efficient personalization that might not be accomplished otherwise. For example, simulated phishing messages may be quickly generated with seed sentences pulled directly from that day's headlines, and further personalized based on the types of threats that a particular user frequently encounters (e.g., simulated phishing tests may mimic real-world threats that may be common at the moment and/or that draw on topics currently in the news, influenced by specific information about the targeted users (e.g., as informed by the inclusion of intelligence gathered using open source intelligence techniques)).

At step 204, the phishing lure generation platform 110 may send the simulated synthetic phishing lure to the user device 130. For example, the phishing lure generation platform 110 may send the simulated synthetic phishing lure via the communication interface 113 and while a wired or wireless data connection is established between the phishing lure generation platform 110 and the user device 130. In some instances, the phishing lure generation platform 110 may also send one or more commands directing the user device 130 to display the simulated synthetic phishing lure.

In some instances, the phishing lure generation platform 110 may send the simulated synthetic phishing lure as an electronic message (e.g., email, text message, chat message, and/or other electronic message). In some instances, in sending the simulated synthetic phishing lure, the phishing lure generation platform 110 may direct the user device 130 to display the simulated synthetic phishing lure within a cybersecurity training application.

Figure 2B:
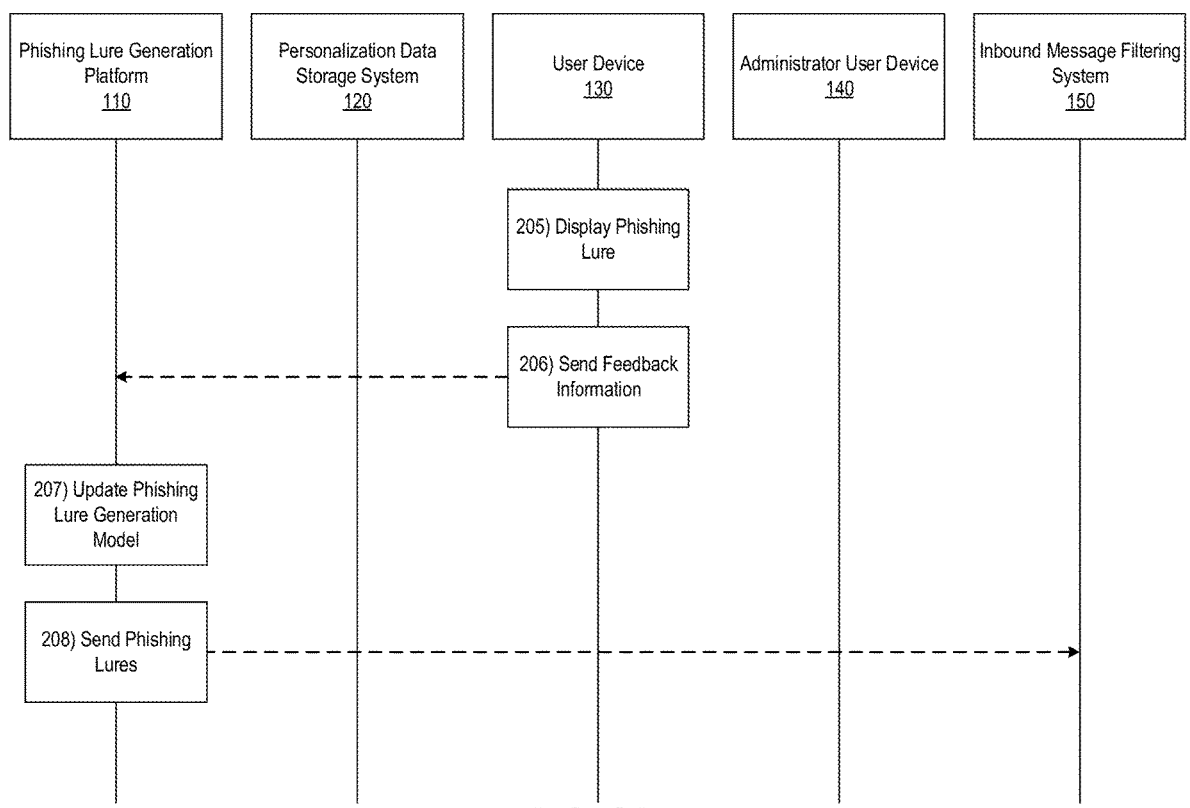
Figure 5:
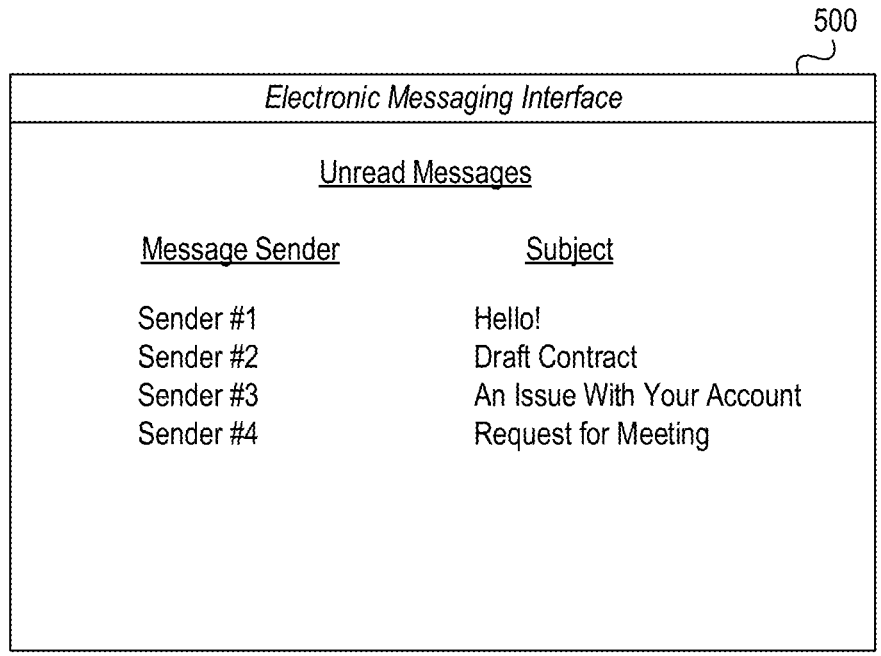
FIGS. 5 and 6 depict illustrative user interfaces using artificial intelligence for phishing lure generation and detection in accordance with one or more example embodiments.

Referring to FIG. 2B, at step 205, based on or in response to the one or more commands sent at step 204, the user device 130 may display the simulated synthetic phishing lure. In some instances, the user device 130 may display the simulated synthetic phishing lure along with one or more other messages (e.g., alongside other, legitimate, messages in an inbox for email, texts, chats, and/or other messages). For example, the user device 130 may display a graphical user interface similar to graphical user interface 505, which is illustrated in FIG. 5. For example, the simulated synthetic phishing lure may be the email listing "An Issue With Your Account" as the subject line. In doing so, the target user may be tested on how well they may identify and avoid a phishing lure amidst their normal course of business. For example, by displaying the simulated synthetic phishing lure alongside legitimate messages, the target user's ability to distinguish between legitimate and phishing messages may be tested.

Figure 6:
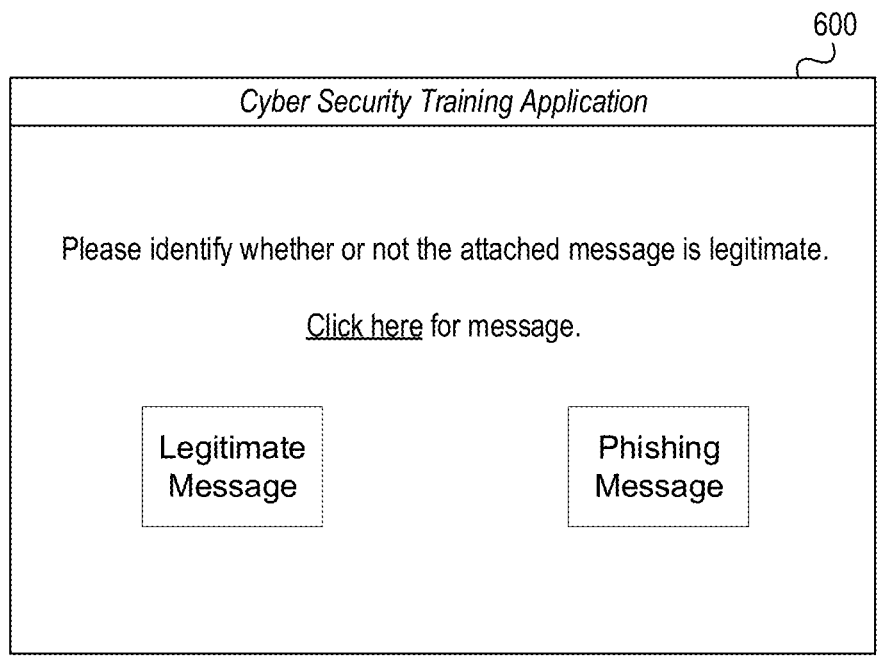

In some instances, the user device 130 may display the simulated synthetic phishing lure in a cybersecurity training application. In these instances, the cybersecurity training application may prompt the target user to label and/or otherwise identify problematic content within the synthetic phishing lure. For example, the user device 130 may display a graphical user interface similar to graphical user interface 605 in FIG. 6. In doing so, the target user may be trained on how to better identify a phishing lure within the context of a training application (e.g., outside of their normal course of messages).

With further reference to FIG. 2B, at step 206, the user device 130 may send feedback information to the phishing lure generation platform 110. For example, the user device 130 may send information indicating interactions between the simulated synthetic phishing lure and the target user. For example, the user device 130 may send information indicating whether or not the target user was deceived by the simulated synthetic phishing lure, correctly identified any problematic content within the synthetic phishing lure, and/or other information. In some instances, the user device 130 may send the feedback information while a wired or wireless data connection is established between the user device 130 and the phishing lure generation platform 110.

In some instances, the feedback information may include open and click rates, effectiveness of specific lure phrasing, specific triggering language, and/or other engagement feedback, which may, e.g., be used to improve the phishing lure generation model. In some instances, the feedback information may include engagement feedback indicating, for the target user, whether messages/exercises received are too difficult, too easy, or provide an adequate level of training. In doing so, training may be further personalized and tailored to the target user's level of security awareness and/or rate of improvement (which may, e.g., be specified by the target user, a system administrator, and/or other individual).

At step 207, the phishing lure generation platform 110 may update the phishing lure generation model using the feedback information. For example, the phishing lure generation platform 110 may establish a dynamic feedback loop with the user device 130 so as to continuously refine, tune, and/or further train the phishing lure generation model based on how effective the simulated synthetic phishing lure was in training the target user (which may, e.g., be represented by whether or not the simulated synthetic phishing lure was effective in deceiving the target user).

In doing so, unlike conventional approaches, the methods described herein may leverage engagement feedback to dynamically refine models/algorithms (e.g., the phishing lure generation model) in order to improve the simulated attacks and/or training exercises in near real time (e.g., such as making the simulated synthetic phishing messages for a given individual more or less difficult depending on their performance).

In some instances, the phishing lure generation platform 110 may automatically and dynamically modify a subsequent simulated synthetic phishing lure within a single session based on the feedback information. For example, in some instances, the phishing lure generation platform 110 may return to step 203 to generate an updated lure. Additionally or alternatively, the phishing lure generation platform 110 may automatically adjust a level of difficulty of training exercises/simulated phishing messages (e.g., making such messages more or less difficult to identify) on a personalized basis based on the feedback information.

Although steps 201-207 are described above with regard to a single simulated synthetic phishing lure, any number of synthetic phishing lures may be generated, deployed (e.g., to any number of users), and/or used to refine the phishing lure generation model without departing from the scope of the disclosure. For example, the simulated synthetic phishing lures may be generated in high volume for use in training a plurality of individuals.

At step 208, the phishing lure generation platform 110 may send one or more phishing lures (e.g., including the simulated synthetic phishing lure generated at step 203) to the inbound message filtering system 150. For example, the phishing lure generation platform 110 may send one or more synthetic phishing lures (e.g., generated by the phishing lure generation platform 110) and/or one or more manually generated phishing lures (which may, e.g., have been previously detected and used to train the phishing lure generation model). In some instances, the phishing lure generation platform 110 may send the one or more phishing lures via the communication interface 113 and while a wired or wireless data connection is established between the phishing lure generation platform 110 and the inbound message filtering system 150.

In doing so, the phishing lure generation platform 110 may cause the one or more phishing lures to be used in adversarial testing of the inbound message filtering system 150. By providing the one or more phishing lures, the phishing lure generation platform 110 may provide a measurable and tunable test corpus to improve detection of both real and synthetic phishing lures.

Figure 2C:
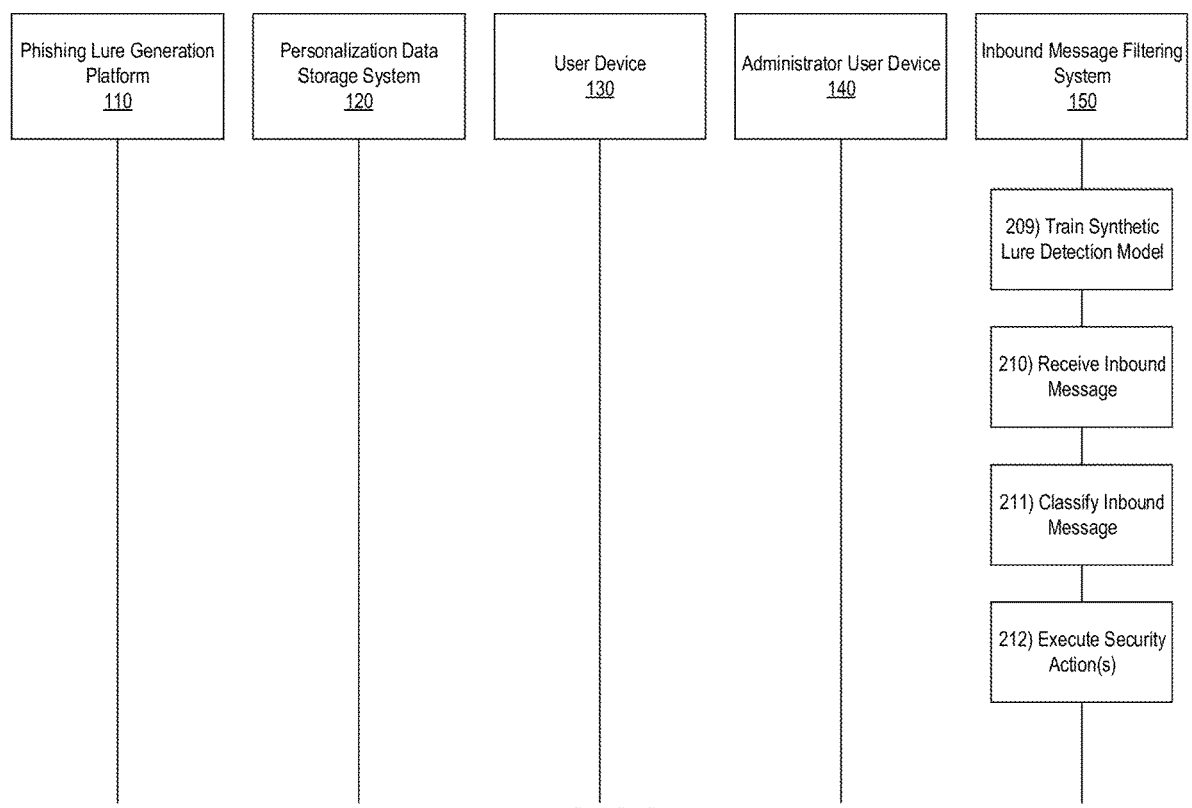

Referring to FIG. 2C, at step 209 the inbound message filtering system 150 may train a phish detection model. For example, the inbound message filtering system 150 may train a machine learning and/or artificial intelligence model to distinguish between legitimate messages and phishing messages. For example, the inbound message filtering system 150 may feed the simulated synthetic phishing lures, other phishing messages, and/or legitimate messages, which may be labelled as "legitimate" or "malicious," into the phish detection model so as to train the phish detection model to distinguish between legitimate and malicious messages.

Additionally or alternatively, the inbound message filtering system 150 may train a machine learning and/or artificial intelligence model to distinguish between manually generated phishing lures and synthetic phishing lures. For example, the inbound message filtering system 150 may feed the manual phishing lures and synthetic phishing lures, which may e.g., be labelled as "manual" or "synthetic" into the synthetic lure detection model so as to train the phish detection model to distinguish between these two types of phishing lures. In some instances, the inbound message filtering system 150 may train the phish detection model using signals indicative of the automated generation of the synthetic lures, such as uniformity, consistency, spelling, n-gram sequence patterns, spacing, paragraphs, line breaks, and/or other language and/or semantic based indicators, which may, e.g., be used to distinguish between synthetic and manually generated lures.

In some instances, in training the phish detection model, the inbound message filtering system 150 may train a supervised learning model, such as artificial neural networks, boosting algorithms, decision tree, nearest neighbor algorithm, support vector machine, random forest, and/or other supervised learning model.

Given that phishing is a technique that depends upon a high degree of volume to be effective (e.g., both to reach targets as well as hedging against detection), the use of AI/ML techniques to generate believable lures significantly tips the scale in favor of the threat actors. The ability to detect lures written by AI/ML models such as GPT may be imperative in spotting believable lures that may otherwise slip past existing detection models (e.g. poorly written lures are often detected and reported earlier).

At step 210, the inbound message filtering system 150 may receive inbound messages. In some instances, the inbound message filtering system 150 may receive legitimate messages (e.g., form various communication devices). In some instances, the inbound message filtering system 150 may receive synthetic phishing lures (e.g., generated and/or sent by the phishing lure generation platform 110). For example, the phishing lure generation platform 110 may send synthetic phishing lures to the inbound message filtering system 150 to perform adversarial testing of the inbound message filtering system 150 (which may e.g., include a threat detection system), which may, e.g., improve the ability of the inbound message filtering system 150 to distinguish between legitimate and malicious messages. In some instances, the inbound message filtering system 150 may receive other phishing lures/messages (e.g., received from bad actors rather than produced by the phishing lure generation platform 110). In some instances, the inbound message filtering system 150 may receive legitimate messages. In some instances, the inbound message filtering system 150 may receive the inbound messages through wired and/or wireless data connection is established.

At step 211, the inbound message filtering system 150 may input an inbound message into the synthetic lure detection model to classify the inbound message. In doing so, the inbound message filtering system 150 may distinguish between synthetically generated and manually generated phishing messages. For example, the synthetic lure detection model may compare content and/or other patterns of the inbound message to the messages used to train the phish detection model (e.g., uniformity, consistency, spelling, n-gram sequence patterns, spacing, paragraphs, line breaks, and/or other language and/or semantic based indicators). In some instances, the inbound message filtering system 150 may use the phish detection model to classify the inbound message as either manually generated or synthetic (e.g., by comparing the inbound message to the historical messages used to train the synthetic lure detection model).

At step 212, based on classification of the phishing lure, the inbound message filtering system 150 may execute one or more security actions. For example, the inbound message filtering system 150 may quarantine the inbound message, route the inbound message to an isolation environment and/or secure sandbox, modify one or more traffic filtering rules, and/or execute other security actions.

Figure 2D:
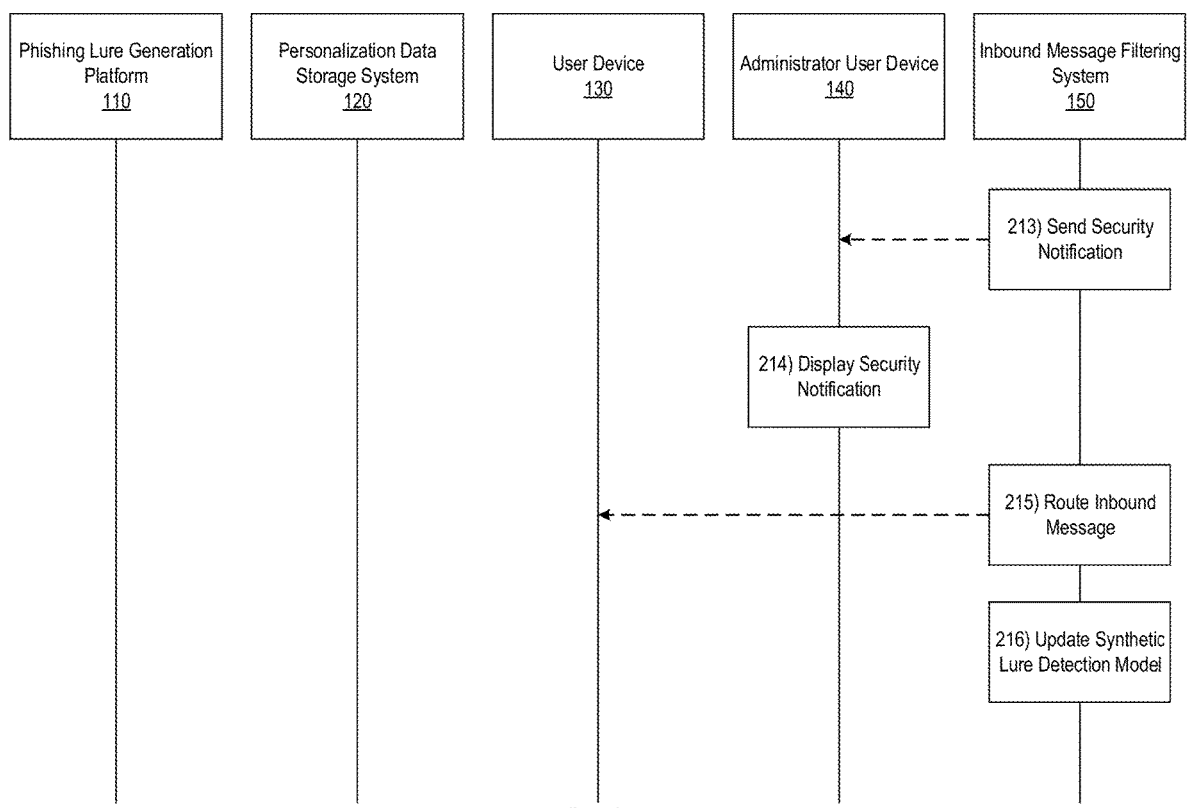

Referring to FIG. 2D, at step 213, the inbound message filtering system 150 may send a security notification to the administrator user device 140. For example, the inbound message filtering system 150 may send a notification to the administrator user device 140 indicating that the manually generated (and/or otherwise malicious) phishing lure was identified. In some instances, the inbound message filtering system 150 may send one or more commands directing the administrator user device 140 to display the security notification. In some instances, the inbound message filtering system 150 may send the security notification to the administrator user device 140 while a wired or wireless data connection is established between the inbound message filtering system 150 and the administrator user device 140.

At step 214, based on or in response to the one or more commands directing the administrator user device 140 to display the security notification, the administrator user device 140 may display the security notification. Once the security notification has been received and displayed, the event sequence may proceed to step 216.

At step 215, the inbound message filtering system 150 may route the inbound message for display at the user device 130. For example, the inbound message filtering system 150 may route the inbound message in addition or as an alternative to executing the one or more security actions as described above at steps 212-214. In doing so, the inbound message filtering system 150 may permit certain phishing lures (generated to provide training to the target user) to be routed to the user device 130 rather than being filtered out as phishing messages. In some instances, the inbound message filtering system 150 may route the inbound message to the user device 130 while a wired or wireless data connection is established between the inbound message filtering system 150 and the user device 130.

At step 216, the inbound message filtering system 150 may refine, re-train, and/or otherwise update the phish detection model based on the output of the synthetic lure detection model (e.g., made at step 211). For example, the inbound message filtering system 150 may establish a dynamic feedback loop to iteratively improve the accuracy of the inbound message filtering system 150 in distinguishing between synthetic and manually generated phishing lures). In doing so, the inbound message filtering system 150 may increase network security by filtering malicious messages directed to users, and may provide enhanced cyber security training to test the ability of users to detect and/or otherwise avoid interaction with personalized phishing lures (e.g., generated by the phishing lure generation platform 110).

Furthermore, as noted above, given that phishing is a technique that depends upon a high degree of volume to be effective (e.g., both to reach targets as well as hedging against detection), the use of AI/ML techniques to generate believable lures significantly tips the scale in favor of the threat actors. The ability to detect lures written by AI/ML models such as GPT may be imperative in spotting believable lures that may otherwise slip past existing detection models (e.g. poorly written lures are often detected and reported earlier).

Figure 3:
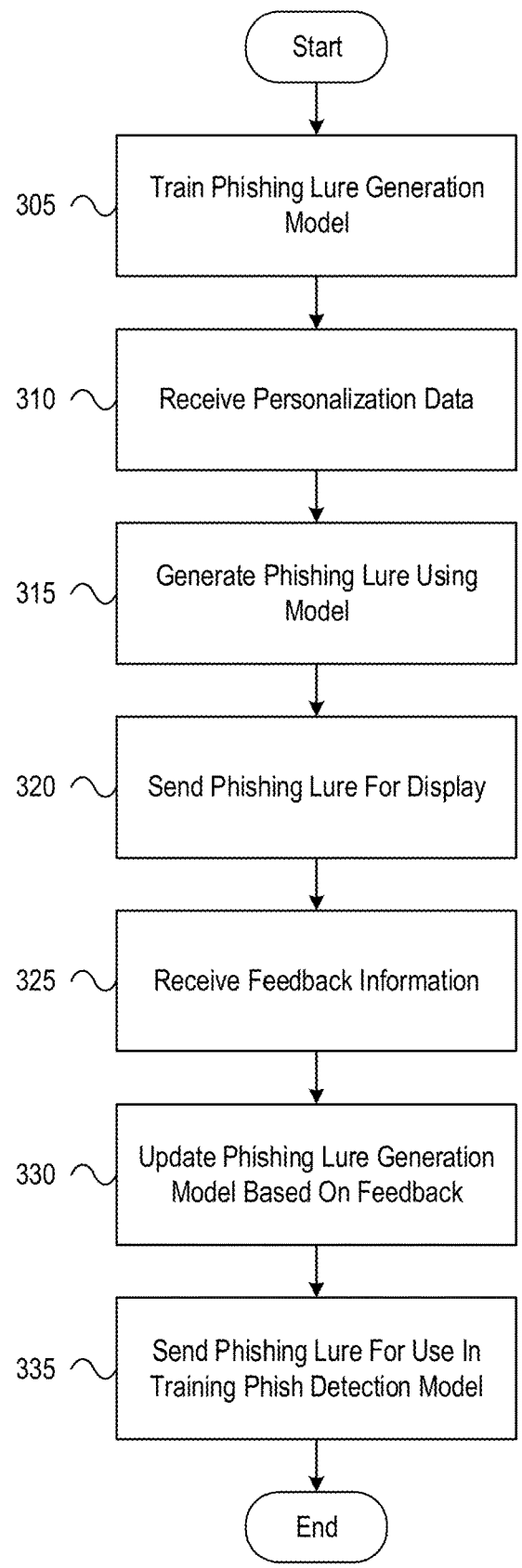
FIGS. 3 and 4 depict illustrative methods for using artificial intelligence for phishing lure generation and detection in accordance with one or more example embodiments.

FIG. 3 depicts an illustrative method for using artificial intelligence for phishing lure detection and synthetic phishing lure generation in accordance with one or more example embodiments. Referring to FIG. 3, at step 305, a computing platform having at least one processor, a communication interface, and memory may train a phishing lure generation model to produce synthetic phishing lures. At step 310, the computing platform may receive personalization data one or more sources. At step 315, the computing platform may generate a synthetic phishing lure, based on the personalization data, and using a phishing lure generation model. At step 320, the computing platform may send the synthetic phishing lure to a target user device for display. At step 325, the computing platform may receive feedback information from the target user device. At step 330, the computing platform may update the phishing lure generation model based on the feedback information. At step 335, the computing platform may send the phishing lure (e.g., to an inbound message filtering system) for use in training a phish detection model.

Figure 4:
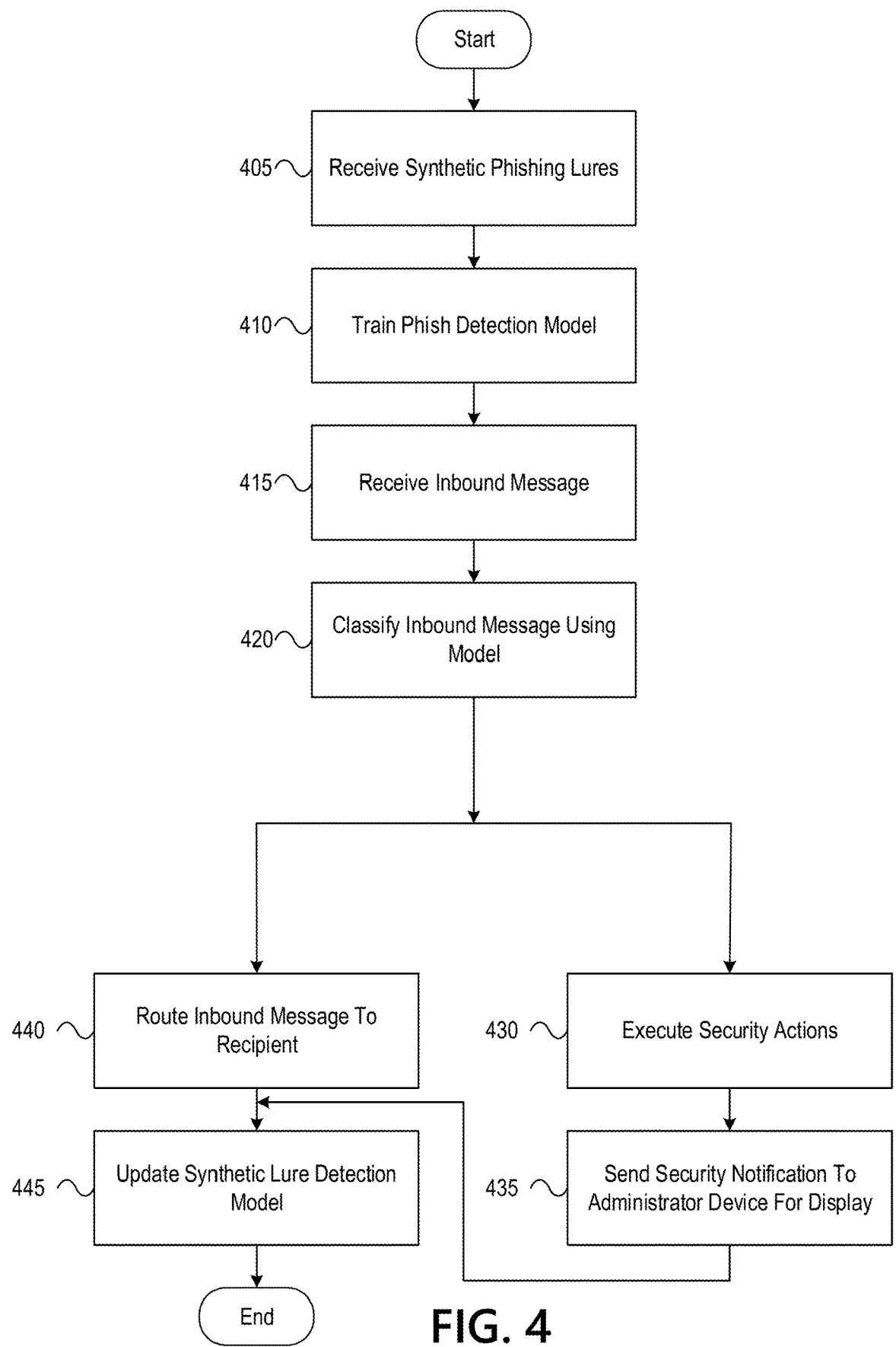

FIG. 4 depicts an illustrative method for using artificial intelligence for phishing lure detection and synthetic phishing lure generation in accordance with one or more example embodiments. Referring to FIG. 4, at step 405, a computing platform having at least one processor, a communication interface, and memory may receive synthetic phishing lures (e.g., from a phishing lure generation platform 110). At step 410, the computing platform may train a phish detection model. At step 415, the computing platform may receive an inbound message. At step 420, the computing platform may classify (e.g., as a legitimate message or malicious phishing message, and more specifically a synthetic phishing message or manual and/or otherwise malicious phishing message) the inbound message using the phish detection model. In some instances, the computing platform may then proceed to step 430 and/or 440. At step 430, the computing platform may execute one or more security actions with regard to the inbound message. At step 435, the computing platform may send a security notification to an administrator device for display. The computing platform may then proceed to step 445 to update the phish detection model based on the classification of the inbound message.

At step 440, the computing platform may route the inbound message to an intended recipient. At step 445, the computing platform may update the phish detection model as described above.

It should be understood that the analysis processes, method steps, and/or methods described herein may be performed in different orders and/or in alternative arrangements from those illustrated herein, without departing from the scope of this disclosure. Additionally or alternatively, one or more of the analysis processes, method steps, and/or methods described herein may be optional and/or omitted in some arrangements, without departing from the scope of this disclosure.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
    at least one processor;
    a communication interface communicatively coupled to the at least one processor; and
    memory storing computer-readable instructions that, when executed by the at least one processor, cause the computing platform to:
    receive personalization data;
    generate, using a phishing lure generation model, one or more simulated synthetic phishing lures based on the personalization data, wherein the personalization data includes current news topics in a region associated with a target recipient of the one or more simulated synthetic phishing lures, wherein the current news topics include seed sentences pulled from a current day's headlines;
    send the one or more simulated synthetic phishing lures to one or more user devices and one or more commands directing the one or more user devices to display the one or more simulated synthetic phishing lures, wherein sending the one or more commands directing the one or more user devices to display the one or more simulated synthetic phishing lures causes the one or more user devices to display the one or more simulated synthetic phishing lures;

receive, from the one or more user devices, feedback data corresponding to user interactions with the one or more simulated synthetic phishing lures; and update, using the feedback data, the phishing lure generation model.

2. The computing platform of claim 1, wherein the one or more simulated synthetic phishing lures comprise phishing messages created using one or more of artificial intelligence or machine learning for awareness training.

3. The computing platform of claim 1, wherein the personalization data comprises one or more of: intelligence data, user-specific data, or regional data.

4. The computing platform of claim 3, wherein the intelligence data comprises business intelligence data specific to a company or an industry associated with users of the one or more user devices.

5. The computing platform of claim 3, wherein the user-specific data indicates roles of users of the one or more user devices within a company or department.

6. The computing platform of claim 1, wherein the phishing lure generation model comprises a natural language generation algorithm.

7. The computing platform of claim 6, wherein the natural language generation algorithm comprises one or more of: generative pre-trained transformer 2 (GPT2) or generative pre-trained transformer 3 (GPT3).

8. The computing platform of claim 1, wherein the memory stores additional computer-readable instructions that, when executed by the at least one processor, cause the computing platform to:

train, using historical phishing messages and legitimate messages, the phishing lure generation model.

9. The computing platform of claim 1, wherein sending the one or more simulated synthetic phishing lures to the one or more user devices comprises sending the one or more simulated synthetic phishing lures as electronic messages to the one or more user devices, and wherein sending the one or more commands directing the one or more user devices to display the one or more simulated synthetic phishing lures causes the one or more user devices to display the one or more simulated synthetic phishing lures along with legitimate messages.

10. The computing platform of claim 1, wherein sending the one or more commands directing the one or more user devices to display the one or more simulated synthetic phishing lures causes the one or more user devices to display the one or more simulated synthetic phishing lures within a cybersecurity training application.

11. The computing platform of claim 1, wherein the memory stores additional computer-readable instructions that, when executed by the at least one processor, cause the computing platform to:

send, to an inbound message filtering system, the one or more simulated synthetic phishing lures, wherein the inbound message filtering system is configured to train, using the one or more simulated synthetic phishing lures, a synthetic lure detection model, wherein training the synthetic lure detection model configures the synthetic lure detection model to distinguish between synthetically generated phishing lures and manually generated phishing lures.

12. The computing platform of claim 11, wherein the inbound message filtering system is configured to:

receive an inbound message;

input, into the synthetic lure detection model, the inbound message; and output, using the synthetic lure detection model, a classification of the inbound message, wherein the classification indicates one of: synthetically generated phishing lure or manually generated phishing lure.

13. The computing platform of claim 12, wherein the inbound message filtering system is configured to execute one or more security actions comprising one or more of: routing the inbound message for further security review, or modifying one or more traffic routing rules corresponding to a sender of the inbound message.

14. The computing platform of claim 12, wherein the memory stores additional computer-readable instructions that, when executed by the at least one processor, cause the computing platform to:

update, using the classification of the inbound message, the synthetic lure detection model.

15. The computing platform of claim 11, wherein the synthetic lure detection model is trained to distinguish between the synthetically generated phishing lures and the manually generated phishing lures based on lure characteristics including one or more of:

uniformity, consistency, spelling, n-gram sequence patterns, spacing, paragraphs, or line breaks.

16. The computing platform of claim 1, wherein generating the one or more simulated synthetic phishing lures comprises generating the one or more simulated synthetic phishing lures in a number of different languages for use in training users in their respective languages.

17. The computing platform of claim 1, wherein the feedback data includes one or more of: open and click rates, effectiveness of specific lure phrasing, or triggering language.

18. A method, comprising:

at a computing platform comprising at least one processor, a communication interface, and memory:

receiving personalization data;

generating, using a phishing lure generation model, one or more simulated synthetic phishing lures based on the personalization data, wherein the personalization data includes current news topics in a region associated with a target recipient of the one or more simulated synthetic phishing lures, wherein the current news topics include seed sentences pulled from a current day's headlines;

sending the one or more simulated synthetic phishing lures to one or more user devices and one or more commands directing the one or more user devices to display the one or more simulated synthetic phishing lures, wherein sending the one or more commands directing the one or more user devices to display the one or more simulated synthetic phishing lures causes the one or more user devices to display the one or more simulated synthetic phishing lures;

receiving, from the one or more user devices, feedback data corresponding to user interactions with the one or more simulated synthetic phishing lures; and updating, using the feedback data, the phishing lure generation model.

19. One or more non-transitory computer-readable media storing instructions that, when executed by a computing platform comprising at least one processor, a communication interface, and memory, cause the computing platform to:

receive personalization data;

generate, using a phishing lure generation model, one or more simulated synthetic phishing lures based on the personalization data, wherein the personalization data includes current news topics in a region associated with a target recipient of the one or more simulated synthetic phishing lures, wherein the current news topics include seed sentences pulled from a current day's headlines;

send the one or more simulated synthetic phishing lures to one or more user devices and one or more commands directing the one or more user devices to display the one or more simulated synthetic phishing lures, wherein sending the one or more commands directing the one or more user devices to display the one or more simulated synthetic phishing lures causes the one or more user devices to display the one or more simulated synthetic phishing lures;

receive, from the one or more user devices, feedback data corresponding to user interactions with the one or more simulated synthetic phishing lures; and update, using the feedback data, the phishing lure generation model.

\* \* \* \* \*